Oct. 15, 1929.   C. H. WIDMAN   1,731,602
VEHICLE BODY CONSTRUCTION
Filed Sept. 24, 1928   2 Sheets-Sheet 2
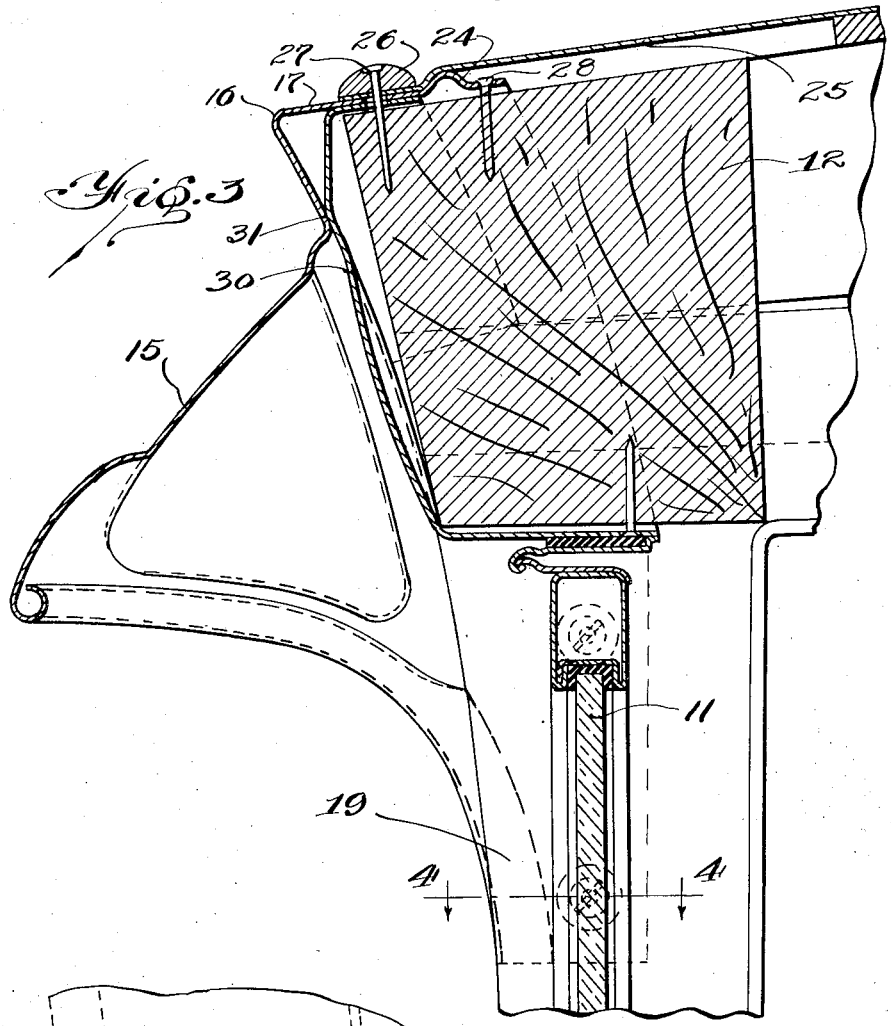
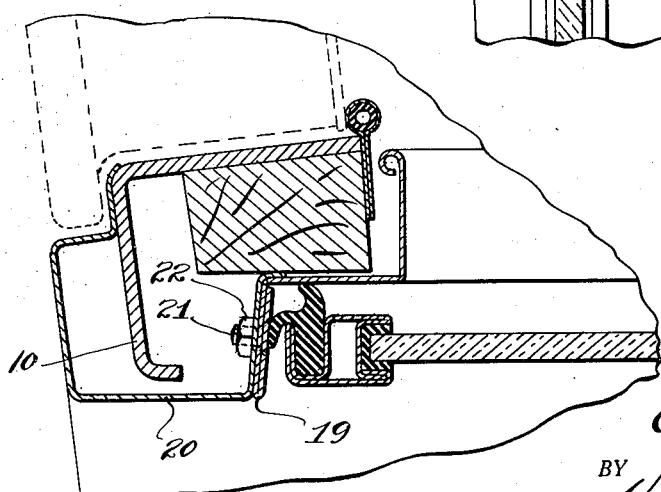
INVENTOR.
Charles H. Widman
BY
Harness, Dickey & Pierce
ATTORNEYS Patented Oct. 15, 1929

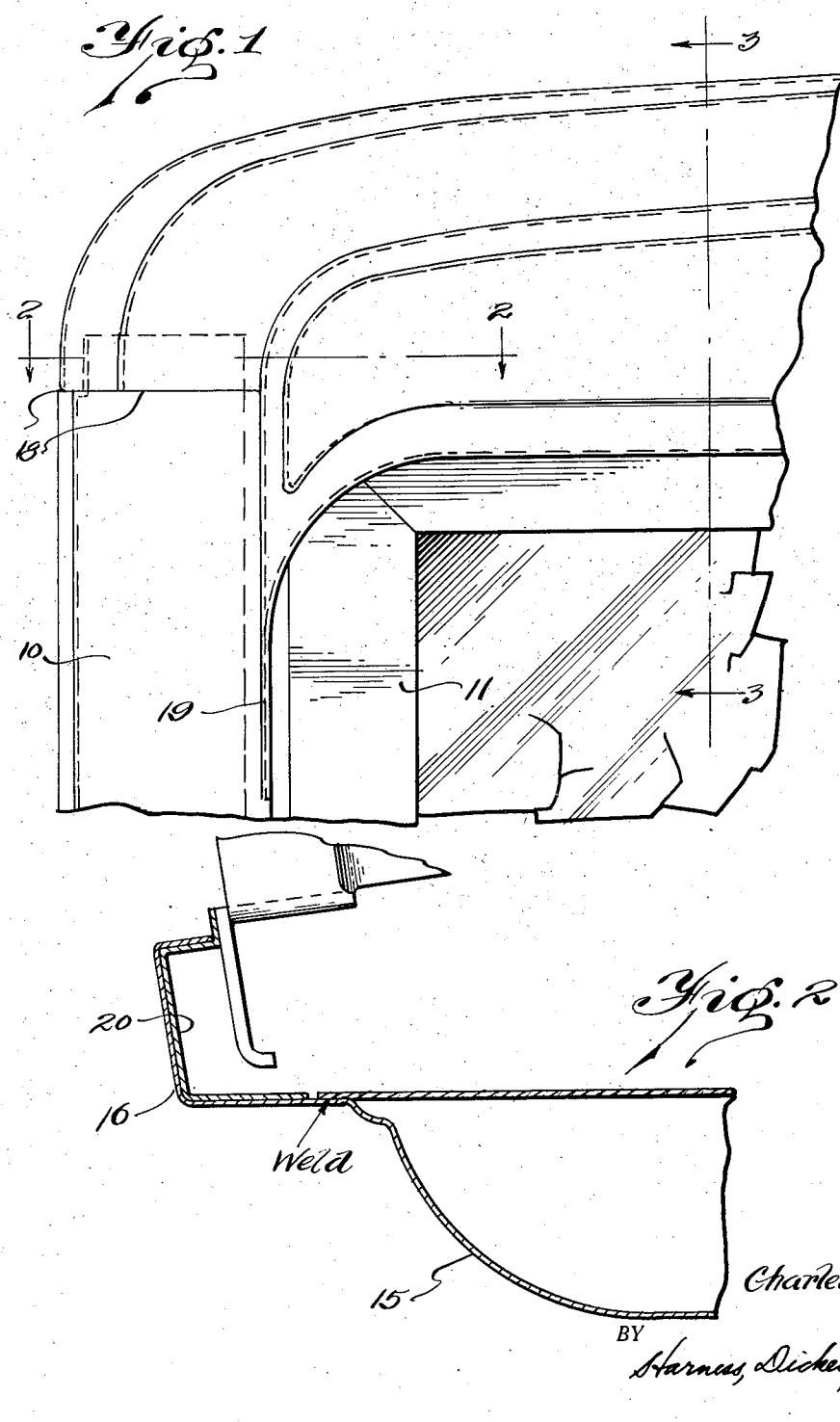

1,731,602

UNITED STATES PATENT OFFICE

CHARLES H. WIDMAN, OF DETROIT, MICHIGAN

VEHICLE BODY CONSTRUCTION

Application filed September 24, 1928. Serial No. 307,957.

One of the objects of my invention is to provide a combined cover panel for the forward roof rail of a vehicle body and a visor for the windshield of such a body.

Another object is to provide as a unitary subassembly a cover panel for the forward roof rail of a vehicle body and a windshield visor.

With these and other objects in view, my invention consists in the arrangement, combination and construction of the various parts of my improved device, as described in the specification, claimed in my claims, and shown in the accompanying drawings, in which:

Fig. 1 is a fragmentary front elevation of a vehicle body to which my device is applied.

Fig. 2 is a view taken on line 2—2 of Fig. 1.

Fig. 3 is a view taken on line 3—3 of Fig. 1.

Fig. 4 is a view taken on line 4—4 of Fig. 3.

It is well understood that the forward end of a closed vehicle body comprises a pair of upright supporting pillars positioned one on each side of the body which support the forward ends of the roof rails and between the upper portions of which is positioned the windshield panel, and that a forward roof rail or cross member extends between and joins the tops of the pillars. The pillars may be of either wood or steel and the forward roof rail may likewise be either of wood or steel.

The numeral 10 indicates the right forward pillar of a vehicle body. 11 is the windshield panel. 12, Fig. 3, is the forward roof rail or cross member which extends between and joins the tops of the pillars. It is customary to provide visors extending across and overhanging the upper portion of the windshield panel and also to provide covers or cover panels for the upper and front surfaces of the forward roof rails, which, without such cover, are normally exposed and must be varnished, or polished, or painted to conform with the finish of the body, if cover panels are not provided therefor. It has heretofore been customary to make and apply such cover panels and visors as separate pieces. I have devised a visor and cover panel which comprises a single metal stamping and which may be applied as a unit. The stamping comprises a hood portion 15 which may be formed in such ornamental shape as is desired and which extends across and overhangs the upper portion of the windshield panel 11. The rear part of the stamping is formed into a cover panel 16 for the forward roof rail 12 and has a portion 17 formed to cover a portion of the upper surface of the roof rail 12, as shown in Fig. 3. This cover portion 16 is formed to extend down over the ends of the roof rail 12, as shown in Fig. 1, and is cut off on the line 18, Fig. 1, where it overlaps the upper ends of the cover panels which are applied to the pillars 10. At each end of the hood portion 15 is formed a depending flange 19 which extends downwardly and rearwardly from the hood portion 15 and is adapted to be positioned against the inner sides of the pillar cover panels 20, Fig. 4, and which may be secured thereto by a bolt 21 and a nut 22.

The portion 17 which covers the ends and upper surface of the roof rail 12 has a raised bead 24 formed adjacent its rear edge and extending longitudinally of the roof rail 12. This bead provides a snubbing projection for the top cover material 25, the edge of which may be drawn down over the forward side of the bead and secured by the molding 26 and the nails 27 to the roof rail 12. The rear edge of the portion 17 is also secured to the roof rail 12 by means of the nails 28.

If desired, an auxiliary cover panel may be combined with my visor and cover panel. This auxiliary form is designated by the numeral 30, Fig. 3, and comprises a channel-shaped member which extends substantially the full length of the roof rail between the pillars 10. The bottom of the channel is disposed over the forward surface of the roof rail 12, as shown in Fig. 3, and the channel sides extend over the upper and lower surfaces of the rail 12 and may be secured thereto by nails or other suitable means.

When it is desired to use this auxiliary panel it may be combined with the visor and the cover panel by welding the same thereto at the point 31, Fig. 3. Thus, the combined visor and cover panel and the auxiliary panel become a subassembly unit which may be applied as such to the body. The formation of the combined visor and cover panel as a single metal stamping makes for a neat and unitary appearance and a material saving in the production and application. It also eliminates a number of joints which must be present if the visor and cover panel are made or applied as separate parts.

Formal changes may be made in the specific embodiment of the invention described without departing from the spirit or substance of the broad invention, the scope of which is commensurate with the appended claims.

What I claim is:

1. In a closed vehicle body having a pair of forward pillars and a header member joining the tops of said pillars, a channel-shaped metal member adapted to cover the forward side of said header member, a hood member having its upper and rear portions formed to cover the upper surface and ends of said header member and having flanges depending from the sides of its hood portion adapted to engage the inner sides of said pillar members, said channel member being nested within and secured to said hood member.

2. A combined windshield visor and cover panel for a closed vehicle body comprising a metal stamping having a hood portion, flanges depending from each side of said hood portion adapted to engage the inner sides of the windshield pillars, a cover panel section formed on the rear of said hood member and shaped to cover the upper side and ends of the top cross member which joins the windshield pillars.

3. A combined windshield visor and cover panel for a closed vehicle body comprising a single metal stamping formed to cover the upper side and the ends of the forward roof rail, and having a hooded portion extending downwardly and outwardly from the front of said roof rail, and having downwardly and rearwardly extending flanges formed at each end of said hooded portion adapted to engage the inner sides of the windshield supports.

4. A combined windshield visor and cover panel for a closed vehicle body having a pair of forward pillars and a forward roof rail joining the tops of said pillars, comprising a single metal stamping formed to cover the upper side and ends of said forward roof rail, having a raised bead formed adjacent its rear edge running longitudinally of said roof rail forming a snubbing projection for roof covering, having a hood portion extending downwardly and outwardly from the forward side of said roof rail, and having depending flanges formed on the ends of said hood portion adapted to engage said forward pillars.

5. A combined windshield visor and cover panel for a closed vehicle body having a pair of windshield supporting pillars and a roof rail joining the tops of said pillars, comprising a single metal stamping formed to cover the top side and ends of said roof rail, and having a hood portion extending across the forward side of said roof rail and overhanging the space between said windshield pillars.

6. A combined windshield visor and cover panel for a closed vehicle body having a pair of windshield supporting pillars and a roof rail joining the tops of said pillars, comprising a single metal stamping formed to cover the normally exposed surfaces of said roof rail, and having a hood portion extending across the forward side of said roof rail and overhanging the space between said windshield pillars.

CHARLES H. WIDMAN.